Dec. 14, 1926.　　　　　　　　　　　　　　　1,610,605
J. B. HENRY
VEHICLE FENDER
Filed Jan. 18, 1926
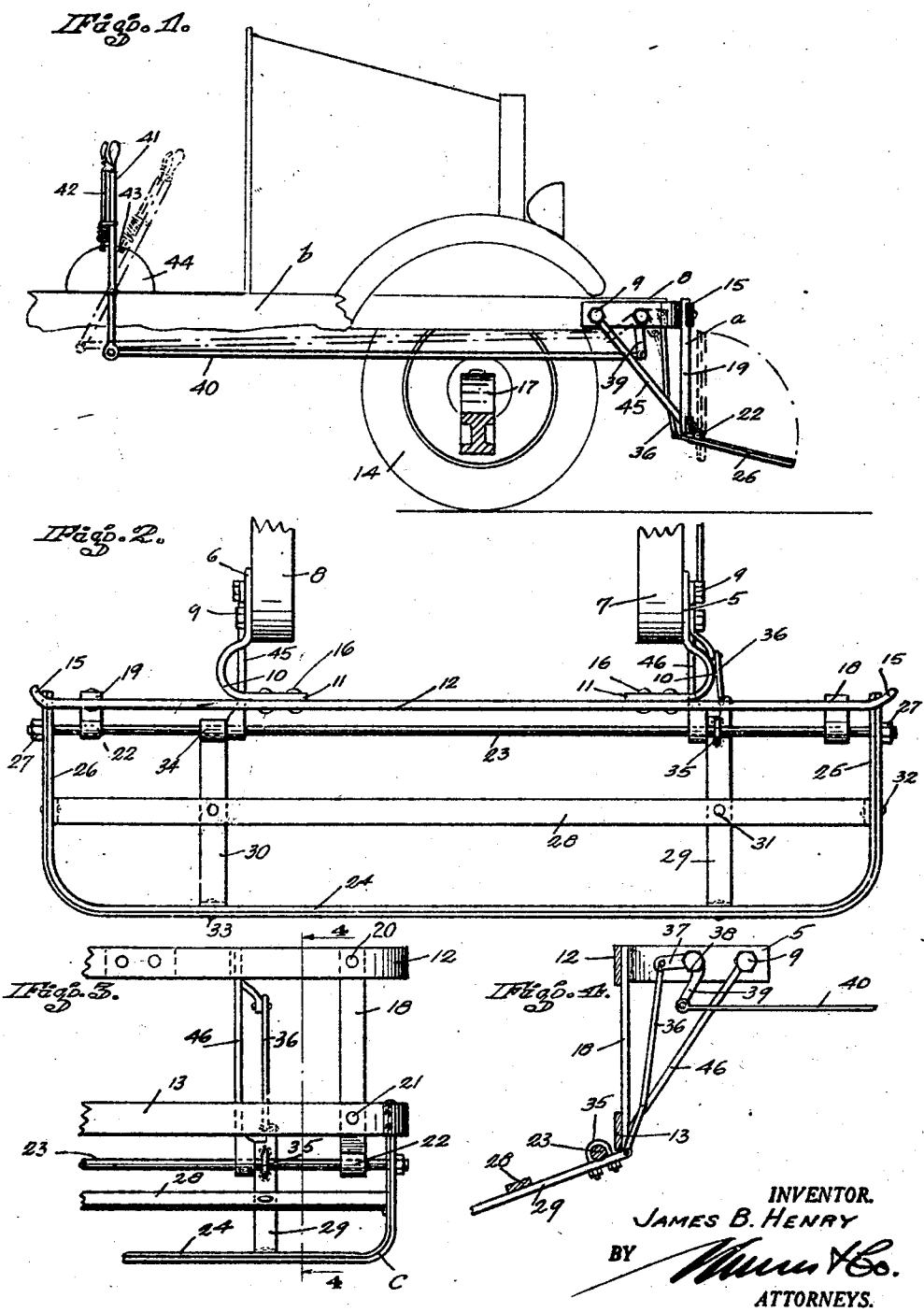
INVENTOR.
JAMES B. HENRY
BY
ATTORNEYS.

Patented Dec. 14, 1926.

1,610,605

UNITED STATES PATENT OFFICE.

JAMES B. HENRY, OF BURLINGAME, CALIFORNIA.

VEHICLE FENDER.

Application filed January 18, 1926. Serial No. 82,109.

The present invention has for its general object to provide a simple and effective means for preventing the wheels of a motor vehicle from rolling over the body of a pedestrian or other object that the vehicle may throw to the ground when in collision therewith.

The invention further proposes to provide a combined bumper and fender constructed so as to harmonize with the structure of the vehicle to which it is attached, so that when used in connection with a passenger carrier vehicle its presence will lend to the general attractiveness of the vehicle as a whole.

A still further object is the provision of an adjustable device which, when in one position of adjustment, is adapted to fulfill the requirements of an ordinary motor vehicle bumper, and, when adjusted into another position, to function as an effective fender in that it is then adapted when moving into collision with an object, to deflect said object from the path of progressive movement of the vehicle.

A still further object is the provision of a combined bumper and fender adapted to be connected to the front end portion of a motor vehicle and to serve as a carrier for luggage, camping equipment and etc., in addition to serving as a combined bumper and fender.

A still further object is the provision of a combined bumper and fender which is adjustable so as to function solely as a bumper when the vehicle to which it is attached is parked or under way in open country, the construction being such that when the device is used as a bumper, greater properties of resistance to collapse upon impact with an object are had than with the ordinary bumper, this increase in stability being had without such material increase in the number and size of the parts as would operate to impart an unwieldy and unsightly appearance to the device and to the vehicle as a whole.

A still further object is the provision of a combined bumper and fender which is readily operable from the driver's seat and while the vehicle is in motion to function as a bumper or as a fender, so that either use may be made of the device in congested city traffic without trouble to the operator of the vehicle, or interrupting traffic.

A still further object is the provision of a combined bumper and fender which when used as a fender and projecting forwardly from the front end of the vehicle will, nevertheless, not require an increase in the space ordinarily required to properly park the vehicle alongside the curbing of a roadway.

The above and other objects are accomplished by instrumentalities pointed out in the following specification.

The invention is clearly defined in the claims.

A satisfactory embodiment of the invention is illustrated in the accompanying drawings forming part of the specification and in which—

Figure 1 is a side elevation of the invention connected to the front end portion of the frame of a motor vehicle, the full line position of the device showing the same in use as a fender and the dotted line position showing the device in use as a bumper.

Figure 2 is a plan view of the device when adjusted to function as a fender, and also showing the connection between the device and the front end portion of the frame.

Figure 3 is a fragmentary front elevation of the end portion on the right of Figure 2, and Figure 4 is a vertical cross section on the line 4—4 of Figure 3.

The combined bumper and fender of the present invention is indicated generally by $a$ and comprises a pair of horizontally disposed supporting arms 5 and 6 which extend forwardly from the front ends of the side bars 7 and 8 of the motor vehicle frame, indicated generally by $b$. The rear end portions of the supporting arms 5 and 6 are rigidly secured in any suitable manner and by preference to the outer face of the side bars 7 and 8 as by bolts 9. The forward end portions of the supporting arms beyond the side bars 7 and 8 are curved outwardly and then inwardly as indicated by 10—10 so as to impart an appreciable degree of resiliency to the arms which are by preference formed of steel.

The terminal portions 11 of the arms 5 and 6 extend inwardly and in opposed directions and along approximately straight lines, and are disposed in spaced relation from the front end of the vehicle frame and for a distance approximating that between the front end of a vehicle frame and the cross bar of an ordinary bumper.

The back portion of the present device comprises resilient metallic upper and lower cross bars respectively indicated by 12 and 13. These bars are disposed transversely of the frame *b* and their end portions extend laterally to points in alinement with the front wheels of the vehicle, one of which is shown and indicated by 14. The terminals of the bars 12 and 13 may be curved rearwardly as at 15 to lend attractiveness to the bars when viewed from the front and to avoid the presence of sharp ends extending across the path of movement of the vehicle. The upper bar 12 is rigidly secured to the terminal portions 11 of the supporting arms by rivets 16 or their equivalents. The lower bar 13 is parallel with the upper bar 12 and its lower side is substantially in horizontal alinement with the lower portion of the front axle 17 of the vehicle, so as to provide the usual clearance.

A plurality of hangers 18 and 19 depend vertically downward from the opposite end portions of the upper cross bar 12 to which they are rigidly secured as by rivets 20, and serve as supports and connecting means between the upper and lower cross bars, rivets 21 or other suitable fastening devices being employed for rigidly securing the lower cross bar 13 to the hangers. The hangers 18 and 19 are by preference formed of material corresponding to the material of the cross bars 12 and 13 in order to impart symmetry to the back portion of the device. The lower ends of hangers 18 and 19 are curved upwardly and inwardly to provide eyes 22 which provide bearings for the opposite end portions of a transversely disposed spindle 23 which forms a portion of the projectable fender and auxiliary bumper, indicated generally by *c*. The frame 24 of the fender is U-shaped and formed of material corresponding to that employed for the cross bars 12 and 13, and has openings in the end portions of its opposite sides 25, 26 for the reception of the screw threaded end portions of the spindle 23 which is secured against displacement by suitable fastening devices, such as nuts 27 screwed upon the end portions of the spindle. The length of the fender approximates the length of the lower cross bar 13 and the mounting of the spindle within the eyes 22 which are bent forwardly so as to project for a slight distance beyond the lower cross bar, permit the fender to be turned upwardly and in parallelism with the back portion, and downwardly and at an angle to the back portion, all of which is shown by full and dotted lines in Figure 1.

In Figures 2 and 3 it will be noted that the opposite sides 25 and 26 of the fender terminate slight distances inwardly from the opposite ends of the lower cross bar 13, and that the lengths of the lower end portions of the hangers 18 and 19 beyond the lower cross bar 13, together with the disposition of the spindle, are such as will permit the terminal portions of the sides 25 and 26 of the fender to move underneath and abut the opposite end portions of the cross bar 13 when the fender is swung downwardly into full line position, as shown in Figures 1, 2 and 3. The end portions of the cross bar 13 in this connection operate as stops to limit the downward turning movement of the fender and in the construction shown, the disposition of the spindle 23 and arrangement of eyes 22 are such that the fender is permitted to slope downwardly and at an obtuse angle to the back portion when in the lowered position, as shown in Figure 1. In this connection it will be observed that a clearance is had between the fender and the ground so that the fender will not drag while the vehicle is in motion, but the clearance is such as will preclude entry between the ground and the fender of an object of ordinary size, such as the body of a pedestrian who, if struck by the vehicle, would in all probability be thrown upon the ground.

The amount of clearance between the fender and the ground when the fender is lowered as shown in Figure 1, is, of course, optional with the user of the device, and can be varied when constructing the device by modifying the lengths of the projecting end portions of the hangers 18 and 19. The fender is reinforced by a skeleton platform consisting of a longitudinally disposed cross bar 28 disposed medially of the frame and transversely disposed cross bars 29 and 30 which are rigidly secured as by rivets 31 to the cross bar 28 and disposed adjacent to the opposite sides 25 and 26. The opposite ends of the cross bar 28 are rigidly secured to the frame by rivets or their equivalents 32. The outer ends of the cross bars 29 and 30 are rigidly secured by rivets 33 to the intermediate portion of the fender and the inner ends of the said cross bars 29 and 30 are rotatable upon the spindle 23.

In the present instance I have shown the cross bar 30 provided with an eye 34 for the reception of the spindle and the opposite cross bar provided with a clevis 35 which receives the spindle. The inner end portion of the cross bar 29 beyond the clevis is pivotally connected to one end of a link 36 which extends upwardly and laterally beyond the supporting arm 5, and is pivoted to one arm of a bell crank 37 fulcrumed as at 38 upon the side 7 of the frame so as to turn vertically, the opposite arm 39 of the bell crank being pivotally connected to one end of a draw rod 40 which extends rearwardly underneath the frame to a position directly under the driver's compartment of the vehicle at which point the draw rod 40 is connected to the lower end of a downwardly extending operating lever or its equivalent 41 extending through the floor of the driver's compartment and fulcrumed therein.

With the construction shown the lever is provided with a latch or dog 42 adapted to engage any of the notches 43 of a segmental keeper 44 which operates to secure the operating member in any of its adjusted positions. Struts 45 and 46 extend downwardly and forwardly from the opposite sides of the frame to which their upper ends are secured, preferably by one of the bolts 9, the lower ends of said struts being provided with openings for the reception of the spindle 23. Obviously with this construction and when the parts are positioned as shown by full lines in Figure 1, a movement of the operating member to the position shown by dotted lines in said figure, will operate to retract the draw rod 40 and rock the bell crank 37 so that the same will be forced downwardly on link 36 which by reason of its connection with the transverse cross bar 29 operates to move the fender upwardly and rearwardly to the position shown by dotted lines in Figure 1. A movement of the operating member to the left in Figure 1 from the position shown by dotted lines, operates to move the parts to the position shown by full lines in the said figure.

It will be noted that the device of this invention is of a neat and attractive appearance, and when the cross bars 12, 13, hangers 18, 19, U-shaped frame and cross bars 28, 30 and 31 are rendered attractive by nickel plating, or its equivalent, the device adds to the general appearance of the vehicle to which it is attached. It will be noted that when the device is in folded position as shown by dotted lines in Figure 1, the fender acts as an auxiliary bumper and by its presence will aid in preventing injury to the mud guards, headlights or radiator of a vehicle in the event of a collision. When the fender is moved into operative position, which is desirable when the vehicle is making headway through congested traffic, the appearance of the vehicle is in nowise detracted from by the presence of the device, it being noted that the extent to which the fender projects in advance of the vehicle is but a trifle more than the ordinary bumper. The fender may remain in the lowered position through the time a vehicle may be parked alongside the curbing without interfering with the operation of a vehicle directly ahead. In this case undue backing of the vehicle ahead would not effect contact between the wheels thereof and the fender in that the overhang of the vehicle ahead, or the rear mudguards thereof would first make contact with the upright back portion of the device. It will be further noted that when the fender is in the lowered position, it can be readily used as a carrier for a tent or other equipment.

In this connection the fender need be only partially lowered to extent substantially at right angles to the back portion of the device.

Although I have shown and described one embodiment of my invention, it is to be understood that the same is susceptible of various changes; and I reserve the right to employ such as may come within the scope of the appended claims.

I claim:

1. A combined bumper and fender for motor vehicles comprising an upright back portion, means resiliently connecting said back portion to the front end portion of the vehicle frame, said back portion being constructed and disposed so as to extend downwardly to a point substantially in horizontal alinement with the front axle and laterally to points substantially in horizontal alinement with the front wheels of the vehicle, a fender portion conforming substantially in area to the back portion and pivotally connected to the lower side portion of the back and movable to a position substantially parallel and in front of the back portion and further movable to a position in angular relation to the said back portion, and means operable from the driver's seat of the vehicle and connected to the fender for operating the same.

2. A combined bumper and fender for motor vehicles comprising an upright back portion adapted to be disposed forwardly of the vehicle frame, means resiliently connecting the back portion to the front end portion of the vehicle and forming the sole support for the said back portion, said back portion being formed so as to extend downwardly from a point substantially in horizontal alinement with the vehicle frame to a point substantially in horizontal alinement with the front axle of the vehicle, a fender conforming substantially in area to the back portion and pivotally connected thereto, and means operable from the driver's seat of the vehicle and connected to the fender for operating the same to move to a position substantially parallel and in front of the back portion and downwardly and outwardly at an angle to the said back portion.

3. A combined bumper and fender for motor vehicles comprising an upright back portion adapted to be connected to the front end portion of the vehicle frame and to extend downwardly to a point substantially in horizontal alinement with the front axle and laterally to points in horizontal alinement with the front wheels, said back portion including a plurality of angularly disposed bars arranged in spaced relation and rigidly connected one to the other, certain of said bars having their ends extended beyond the lower side of said back portion, a fender conforming substantially in area to the back portion and having one side portion pivotally connected to the extending end portions of said bars and adapted to engage others of said bars and be supported thereby when turned into one position, and means connected to the fender and operable from the driver's seat for moving the fender into a position substantially parallel and in front of the back portion and downwardly and outwardly to a position in angular relation to the back portion.

4. A combined bumper and fender for motor vehicles comprising an upright back portion adapted to be connected to the front end portion of the vehicle frame and to extend downwardly to a point substantially in horizontal alinement with the front axle and laterally to points in horizontal alinement with the front wheels, a fender conforming substantially in area to the area of the back portion and including a U-shaped frame and angularly disposed cross bars rigidly secured to the frame and similarly secured to one another, certain of said cross bars being pivotally connected to the lower side of the front portion, and means operable from the driver's seat and connected to the fender for operating the same to move into a position in front of and substantially parallel with the back portion and downwardly and outwardly to a position in angular relation to the back portion.

JAMES B. HENRY.